(12) United States Patent
Dowd et al.

(10) Patent No.: US 7,996,201 B2
(45) Date of Patent: *Aug. 9, 2011

(54) NETWORK SECURITY MODELING SYSTEM AND METHOD

(75) Inventors: Alan Dowd, White Bear Lake, MN (US); Thomas R. Markham, Anoka, MN (US); Tomo Foote-Lennox, Maple Grove, MN (US); David Apostal, Roseville, MN (US); Raymond Lu, Shoreview, MN (US)

(73) Assignee: McAfee, Inc., Santa Clara, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/977,074

(22) Filed: Oct. 23, 2007

(65) Prior Publication Data
US 2008/0222731 A1   Sep. 11, 2008

Related U.S. Application Data

(63) Continuation of application No. 09/483,127, filed on Jan. 14, 2000, now Pat. No. 7,315,801.

(51) Int. Cl.
*G06F 17/50* (2006.01)
*G06F 15/173* (2006.01)

(52) U.S. Cl. ............................ 703/13; 709/224; 715/736

(58) Field of Classification Search ........ 726/3; 703/13; 709/224; 715/736; 716/101
See application file for complete search history.

(56) References Cited

U.S. PATENT DOCUMENTS

| | | | |
|---|---|---|---|
| 4,937,825 A | 6/1990 | Ballard et al. | |
| 4,942,573 A | 7/1990 | Woodward | |
| 5,558,339 A | 9/1996 | Perlman | |
| 5,662,478 A | 9/1997 | Smith, Jr. | |
| 5,684,957 A | 11/1997 | Kondo et al. | |
| 5,754,831 A * | 5/1998 | Berman | 703/13 |
| 5,809,282 A * | 9/1998 | Cooper et al. | 709/226 |
| 5,835,726 A | 11/1998 | Shwed et al. | |
| 5,864,683 A | 1/1999 | Boebert et al. | |
| 5,961,644 A | 10/1999 | Kurtzberg et al. | |
| 6,014,697 A | 1/2000 | Lewis et al. | |
| 6,088,804 A | 7/2000 | Hill et al. | |
| 6,253,337 B1 | 6/2001 | Maloney et al. | |
| 6,282,546 B1 | 8/2001 | Gleichauf et al. | |
| 6,298,445 B1 | 10/2001 | Shostack et al. | |
| 6,321,338 B1 | 11/2001 | Porras et al. | |
| 6,324,656 B1 | 11/2001 | Gleichauf et al. | |
| 6,343,362 B1 | 1/2002 | Ptacek et al. | |
| 6,352,479 B1 | 3/2002 | Sparks, II | |
| 6,370,648 B1 | 4/2002 | Diep | |
| 6,393,386 B1 | 5/2002 | Zager et al. | |
| 6,408,391 B1 | 6/2002 | Huff et al. | |

(Continued)

OTHER PUBLICATIONS

"Notice of Allowance mailed Aug. 10, 2007 in U.S. Appl. No. 09/483,127", NOAR,4.

(Continued)

*Primary Examiner* — Dwin M Craig
(74) *Attorney, Agent, or Firm* — Schwegman, Lundberg & Woessner, P.A.

(57) ABSTRACT

A network security modeling system which simulates a network and analyzes security vulnerabilities of the network. The system includes a simulator which includes a network vulnerabilities database and a network configuration module having network configuration data. The simulator determines vulnerabilities of the simulated network based on the network configuration data and the vulnerabilities database.

23 Claims, 6 Drawing Sheets

U.S. PATENT DOCUMENTS

| | | | |
|---|---|---|---|
| 6,442,694 | B1 | 8/2002 | Bergman et al. |
| 6,535,227 | B1 | 3/2003 | Fox et al. |
| 6,574,737 | B1 | 6/2003 | Kingsford et al. |
| 6,834,350 | B1 * | 12/2004 | Boroughs et al. .................. 726/3 |
| 7,315,801 | B1 * | 1/2008 | Dowd et al. ..................... 703/13 |

OTHER PUBLICATIONS

Farkas, Bart, "Prima's Official Strategy Guide", *Star-Craft Expansion Set Brood War*, Prima Publishing,(1998),215-222.

Ghosh, S., et al., "A Framework for Investigating Attacks in ATM Networks", *IEEE Military Communications Conference Proceedings* Vol. 1, (1999),724-728.

Johnson, J. T., "Simulated Attack for Real Network Security", *Data Communications*, (Nov. 21, 1995),31-32.

Samfat, D., et al., "A GSM Simulation Platform for Intrusion Detection", *IEEE Int'l Conference on Communications*, ICC vol. 2, 1995, 766-770.

Smith, R., et al., "A Protocol and Simulation for Distributed Communicating Firewalls", *COMPSAC*, (1999),74-79.

\* cited by examiner

NETWORK SECURITY MODELING SYSTEM AND METHOD

RELATED APPLICATIONS

This application is a continuation application of U.S. Utility application Ser. No. 09/483,127, filed Jan. 14, 2000, now issued as U.S. Pat. No. 7,315,801, which application is incorporated herein by reference.

NOTICE OF FEDERALLY SPONSORED RESEARCH

Portions of this invention may have been developed under Contract No. F30602-97-C-0245, awarded by the Defense Advanced Research Projects Agency. Therefore, the U.S. Government may have a paid-up license in portions of this invention and the right, in limited circumstances, to require the patent owner to license others on reasonable terms as provided for by the terms of the contract.

FIELD OF THE INVENTION

The present invention is related to network security, and more particularly to a system and method for analyzing network vulnerabilities.

BACKGROUND INFORMATION

With the changing environment for computer systems and networks and a plethora of information being transferred between systems internal and external to a network the need for security measures has become vital. Not only is there a need for protection and detection systems such as firewalls and scanners but identification of potential vulnerabilities is also needed. Conventional network vulnerability tools such as CyberCop, Satan and Cyberscanner only look at the exposed face of a network or they may look at a network inside but they do not look at the interactions of the network components. For example, the current network vulnerability tools do not see that the vulnerability on machine X will allow it to then be used to compromise machine Y. Additionally, these types of tools do not show the path of an attack when Y is compromised. Another drawback of many of the conventional tools is the inability to detect and defeat hackers in real time.

There is a need to detect a series of low to high risk problems without disrupting the current network and without leaving footprints such as event log entries and the like on scanned machines. A system that would assist information technology (IT) managers to successfully oppose hackers and provide a clear picture of vulnerabilities across enterprise networks as well as local area networks is needed. Often the security risks are at the locations such as firewalls and gateways which let information flow. Without sufficient security tools valuable information can be compromised at these locations.

What is needed is a system and method that analyzes the vulnerability of a network based on its current configuration by investigating possible attacks on a model of the network. A system is needed that performs both perimeter and internal network vulnerability checks. In addition, what is needed is a system and method which takes and uses conventional tools as discovery mechanisms.

For the reasons stated above, and for other reasons stated below which will become apparent to those skilled in the art upon reading and understanding the present specification, there is a need in the art for a modeling system which efficiently analyzes the vulnerability of a network using a network model.

SUMMARY OF THE INVENTION

The above mentioned problems with network security and other problems are addressed by the present invention and will be understood by reading and studying the following specification.

According to one aspect of the invention, a network security modeling system which simulates a network and analyzes security vulnerabilities of the network is provided. The system includes a simulator which includes a network vulnerabilities database and a network configuration module having network configuration data. The simulator determines vulnerabilities of the simulated network based on the network configuration data and the vulnerabilities database According to another aspect of the present invention, a security modeling system comprising a network configuration module which has network configuration data and a simulator coupled to the network configuration module for simulating and analyzing networks based on the network configuration is provided. The simulator includes a network vulnerabilities database. Additionally, the system includes a mission objectives module which is coupled to the simulator and includes critical resource information.

Further, in another embodiment a method of analyzing a computer network using a security modeling system is provided. The security modeling system includes a database of network vulnerability data. The method comprises providing a configuration of a computer network, simulating the network based on the network configuration and determining vulnerabilities of the simulated network using the vulnerability information stored in the database.

BRIEF DESCRIPTION OF THE DRAWINGS

In the drawings, where the like number reflects similar function in each of the drawings.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention. The following detailed description is, therefore, not to be taken in a limiting sense.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
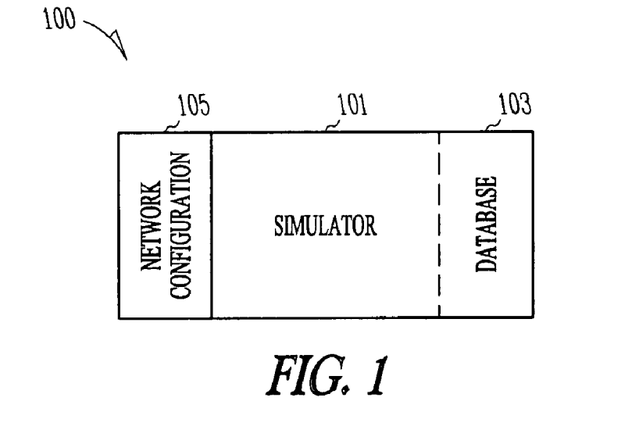
FIG. 1 is a block diagram of one embodiment of a security modeling system according to the teachings of the present invention.

FIG. 1 is a block diagram of one embodiment of a security modeling system indicated generally at 100, including a simulator 101 and a network configuration module 105, according to the teachings of the present invention. Simulator 101 simulates networks based on network configuration data of the network configuration module 105. The networks include enterprise networks, wide area networks, local area networks and the like as well as components of networks. The network configuration data stored in the network configuration module 105 represents network components such as servers, workstations, routers and firewalls and the protocols and services that run on these components.

In one embodiment, the network configuration data is stored in database tables such as configuration tables, defense tables, filter tables, node tables, password tables, routing tables and the like. The data is presented in the tables so as to be processable by a machine such as a computer or microprocessor.

The simulator 101 includes a network vulnerabilities database 103 which contains vulnerability data about conventional network components such as computer systems, servers, routers, network configurations, services, hardware and software. The database 103 includes vulnerability information extracted from a variety of resources such as the Computer Emergency Response Team (CERT®), Computer Incident Advisory Capability (CIAC) of the Department of Energy, Security-Focus' BugTraq mailing lists and system documentation as well as vulnerability information about specific network systems, computer hardware and software, hacker data and the like. In one embodiment, the vulnerability data is stored in database tables such as defense specification tables, service tables and the like. The data is presented in the tables so as to be processable by a machine such as a computer or microprocessor.

Using the vulnerabilities database 103 the simulator 101 simulates the objective network and provide information about security vulnerabilities within the perimeter of the network and outside the network.

The simulator 101 analyzes networks and determines vulnerabilities of the simulated network based on the vulnerability information and the network configuration data. Analyzing networks and determining vulnerabilities includes running simulations using different attack scenarios or models. The network configuration data is pre-determined by an administrator or other user and stored in the network configuration module 105. In an alternate embodiment, the simulator 101 determines vulnerabilities of the simulated network based on the vulnerability information and network configuration data output by a network configuration tool such as CyberCop, Cyberscanner or Axent Enterprise Management System or a combination of data output by a network configuration tool and data provided from the output of an objective network or from a user such as an administrator. The simulator 101 looks at the interactions of the network components as well as the interior and the exposed face of the network and determines security vulnerabilities. In alternate embodiments, the network vulnerabilities database 103 includes specific vulnerability information such as attack and exploitation data.

The network configuration module 105 includes selective information about the networks being simulated such as network and system components to include in the simulation, which version of the systems being simulated are present and configuration and node data. In one embodiment, the simulator 101 includes a graphical user interface. A client such as an administrator or other user modifies a simulation by changing the conditions of a simulation, adding or removing network components such as a particular firewall or network manager. The simulator then runs a number of security vulnerability permutations of the objective network based on each change or a plurality of changes. The permutations include general security vulnerabilities or specific security vulnerabilities based on specific attack scenarios or general attack scenarios.

In one embodiment, the network configuration module 105 receives network configuration data from the network being simulated or "objective network" and determines what the objective network comprises. In an alternate embodiment, the network configuration module 105, whether connected to the objective network, to the output of a network configuration discovery tool or a user interface, receives information, through a graphical user interface, which modifies the network simulation. For example a user such as an administrator provides input which limits how much the simulator 101 simulates, adds in additional components or updated versions of components in order to evaluate the network when the current configuration is changed. A system administrator or other user may want to see what vulnerabilities the current network will encounter if a new client is allowed to interact with the network, if new internal users are added, if current software systems are changed, if a new security system is implemented or if components are removed from the network. In one embodiment, an administrator or other user modifies the network configuration data using a graphical user interface. In an alternate embodiment, the system administrator or other user modifies the vulnerabilities database 103 using a graphical user interface. Vulnerabilities identified through a simulation are added to the vulnerabilities database 103 as well as current vulnerability data provided by software and hardware companies, hacker web sites, security monitoring services and the like. In one embodiment, the simulator 101 is pre-programmed to run a standard security check. In another embodiment, the simulator 101 is instructed to run a user defined security check through an input such as a graphical user input. The simulator 101 simulates the objective network and the attacker.

In one embodiment, the security modeling system 100 is used to evaluate current network security systems and proposed network security systems. The security modeling system 100 scores the security system based on its effectiveness in defending critical resources. In an alternate embodiment, the security modeling system 100 scores the security system by measuring the effectiveness based on its ability to defend critical resources with the least amount of time and resources expended.

In one embodiment, the security modeling system 100 includes both a defender and an attacker interface. This allows simulation in real-time with the defender and attacker receiving feedback from the security modeling system 100 based on current network status, time and resources expended. In one embodiment, an attacker can send commands that simulate service functionality, that change services or nodes and that exploit vulnerabilities. The defender or administrator can interactively adjust the posture of a node, set router and firewall filtering policies, and reset nodes or services that have been disabled or compromise. In one embodiment, the user such as an attacker or defender can view a map of the network they are discovering. In another embodiment, the user can interact with the system using a map or network configuration data through manual input, point and click processes, touch screens and the like.

In one embodiment, the security modeling system 100 is portable.

Figure 2:
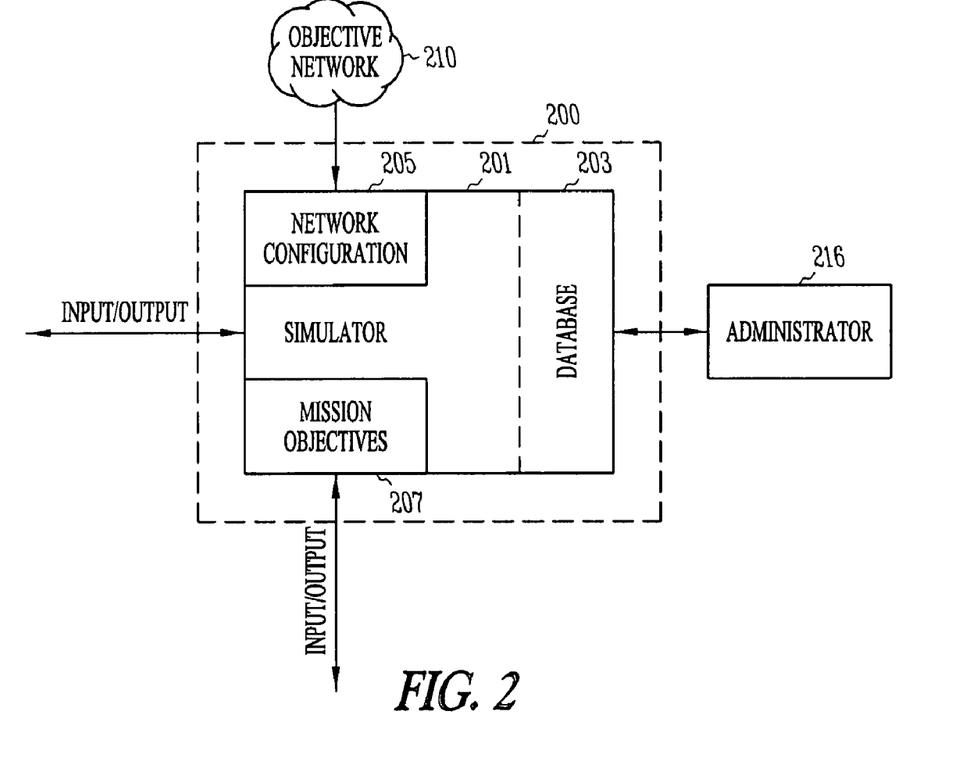
FIG. 2 is a block diagram of another embodiment of a security modeling system according to the teachings of the present invention.

FIG. 2 is a block diagram of another embodiment of a security modeling system, indicated generally at 200, according to the teachings of the present invention. A simulator 201 is coupled to a network configuration module 205 and a mission objectives module 207. The simulator 201 simulates networks based on the network configuration data of the network configuration module 205. The networks include enterprise networks, wide area networks, local area networks and the like as well as components of networks. The simulator 201 includes a network vulnerabilities database 203 which contains vulnerability data about conventional network components. The database 203 includes vulnerabilities information extracted from centers such as the Computer Emergency Response Team (CERT®), Computer Incident Advisory Capability (CIAC) of the Department of Energy, SecurityFocus' BugTraq mailing lists and system documentation as well as vulnerabilities information about specific network systems, computer hardware and software, hacker data and the like. Using the vulnerabilities database 203 the simulator 201 simulates the objective network and provides information about security vulnerabilities within the perimeter of the network and outside the network.

In one embodiment, the vulnerability data is stored in database tables such as defense specification tables, service tables and the like. The data is presented in the tables so as to be processable by a machine such as a computer or microprocessor.

The simulator 201 analyzes networks and determines vulnerabilities of the simulated network based on the vulnerability data and the network configuration data. Analyzing networks and determining vulnerabilities includes running simulations using different attack scenarios or models. The network configuration data is pre-determined by an administrator or other user and stored in the network configuration module 205. In an alternate embodiment, the simulator 201 determines vulnerabilities of the simulated network based on the vulnerability data and network configuration data output by a network configuration tool such as CyberCop or CyberScanner or a combination of data output by a network configuration tool and data provided by a user such as an administrator or an objective network 210. The simulator 201 looks at the interactions of the network components as well as the interior and exterior face of the network.

In one embodiment, the network configuration data is stored in database tables such as configuration tables, defense tables, filter tables, node tables, password tables, routing tables and the like. The data is presented in the tables so as to be processable by a machine such as a computer or microprocessor.

The mission objectives module 207 which is coupled to the simulator 201 includes critical resource information such as goals, expectations and constraints for simulating the network. The simulator 201 uses the critical resource information to determine that a particular file or other entity such as a service or node, etc., is significant for a specific attack scenario or simulation. The information is referred to as mission objectives information and an objectives specification interchangeably. In one embodiment, the mission objectives information is stored in database tables such as mission tables, mission file tables, mission service tables and the like. The data is presented in the tables so as to be processable by a machine such as a computer or microprocessor.

The network configuration module 205 includes selective information about the networks being simulated such as network and system components to include in the simulation, which versions of the network being simulated are present and configuration and node data. In one embodiment, the simulator 201 includes a graphical user interface. A client such as an administrator or other user modifies a simulation by changing the conditions of a simulation, adding, reconfiguring or removing network components such as a particular firewall or network manager and then runs a number of security vulnerability permutations of the objective network 210. The simulator 201 is pre-programmed to run a standard security check or to run a user defined security check. In an alternate embodiment, the security modeling system includes a graphical user interface which allows the system to interface with clients and attackers. The clients and attackers may be simulated or real and operate in real time.

In an alternate embodiment, the network configuration module 205 is connected to the objective network 210 and determines what the system that is being simulated comprises. In an alternate embodiment, the network configuration module, 205 whether connected to the objective network 210, to the output of a network configuration discovery tool or a user interface, receives information through a graphical user interface and modifies the simulation. An administrator or other user provides input through the graphical user interface which limits how much of the network is simulated, adds components or updates versions of components in order to evaluate the network. A system administrator or other user runs simulations to determine what vulnerabilities the current network will encounter if a new client is allowed to interact with the network, if new internal users are added, if current software systems are changed, if a new security system is implemented or if components are added or removed from the network.

In one embodiment, a user such as an administrator modifies the network configuration data using a graphical user interface. In one embodiment, the user modifies the mission objectives information using a graphical user interface. Modifying the mission objectives information includes changing a threat scenario and defining critical resources. In an alternate embodiment, the system administrator or other user modifies the vulnerabilities database 203 using a graphical user interface. Vulnerabilities identified through a simulation are added to the vulnerabilities database 203 as well as current vulnerability data provided by software and hardware companies, hacker web sites, security monitoring services and the like. In one embodiment, an attacker can send commands that simulate service functionality, that change services or nodes and that exploit vulnerabilities. The defender or administrator can interactively adjust the posture of a node, set router and firewall filtering policies, and reset nodes or services that have been disabled or compromise. In one embodiment, the user such as an attacker or defender can view a map of the network they are discovering. In another embodiment, the user can interact with the system using a map or network configuration data through manual input, point and click processes, touch screens and the like.

In one embodiment, the security modeling system 200 is used to evaluate current network security systems and proposed network security systems. The security modeling system 200 scores the security system based on its effectiveness in defending critical resources. In an alternate embodiment, the security modeling system 200 scores the security system by measuring its effectiveness based on its ability to defend critical resources with the least amount of time and resources expended.

In one embodiment, the security modeling system 200 includes both a defender and an attacker interface. This allows simulation in real-time with the defender and attacker receiving feedback from the security modeling system 200 based on current network status, time and resources expended.

In one embodiment, the security modeling system 200 is portable.

Figure 3:
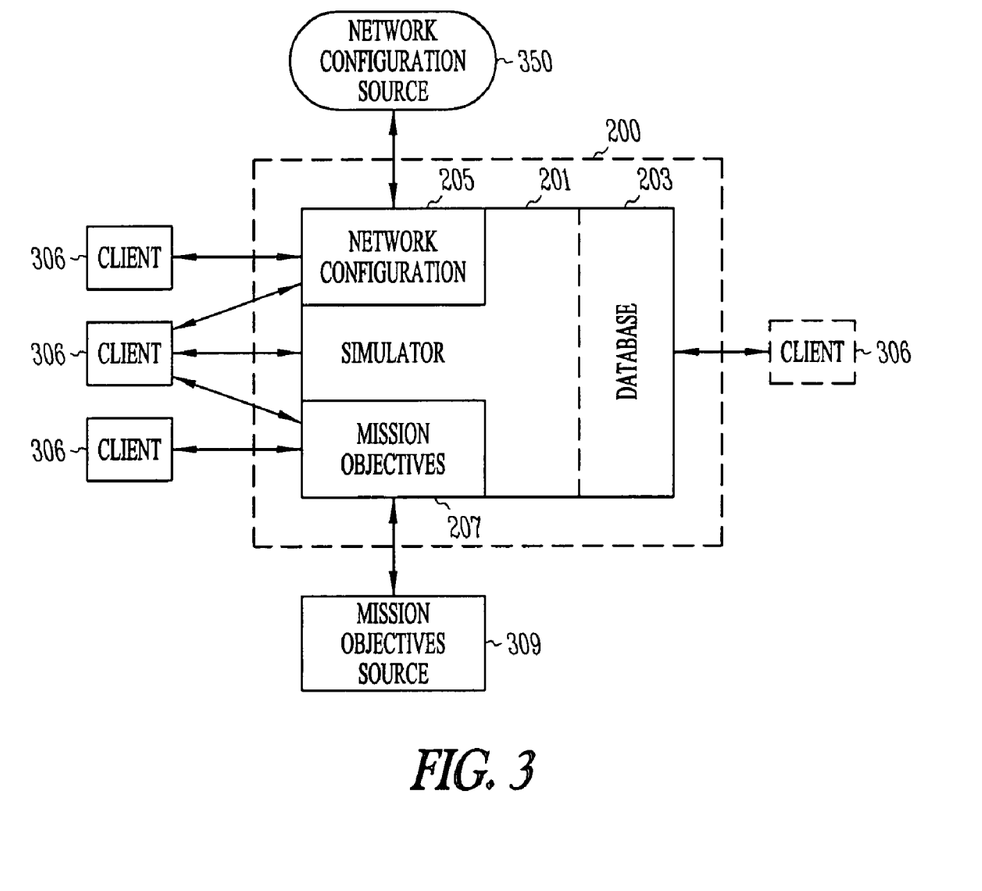
FIG. 3 is a block diagram of an alternate embodiment of a security modeling system according to the teachings of the present invention.

FIG. 3 is a block diagram of an alternate embodiment of a security modeling system indicated generally at 200, including a simulator 201, according to the teachings of the present invention. FIG. 3 provides the simulator 201 having a vulnerabilities database 203 and coupled to a network configuration module 207 and a mission objectives module 205 as discussed with respect to FIG. 2 above.

FIG. 3 further provides interface options with clients, users, attackers, defenders, system administrators, network configuration data sources and mission objectives data sources. In one embodiment, the security modeling system 200 is interfaced to receive and output information to a plurality of users. The simulator 201 provides output to clients 306 such as administrators, defenders, attackers and other users. This is accomplished through a single graphical user interface or multiple graphical user interfaces. The simulator 201 also receives input such as commands, requests, updates and modifications to attack scenarios, defense scenarios, network configuration data, mission objectives information and databases. Inputs are received through a single graphical user interface or multiple graphical user interfaces. In one embodiment, an attacker can send commands that simulate service functionality, that change services or nodes and that exploit vulnerabilities. The defender or administrator can interactively adjust the posture of a node, set router and firewall filtering policies, and reset nodes or services that have been disabled or compromised. In one embodiment, the user such as an attacker or defender can view a map of the network they are discovering. In another embodiment, the user can interact with the system using a map or network configuration data through manual input, point and click processes, touch screens and the like.

In one embodiment, network configuration data is received from a variety of network configuration sources 350. Some representative sources include an objective network, the output of a network configuration discovery tool, both an objective network and output of a discovery tool, a system administrator or other user and the like. In an alternate embodiment, the network configuration module 205 provides information to an administrator or other user. In one embodiment, the network configuration data is stored in database tables such as configuration tables, defense tables, filter tables, node tables, password tables, routing tables and the like. The data is presented in the tables so as to be processable by a machine such as a computer or microprocessor.

In another embodiment, mission objectives information is received from objectives sources 309 such as an administrator or other user. In an alternate embodiment, the mission objectives module 207 provides information to an administrator or other user through a graphical user interface or other output. In one embodiment, the mission objectives information is stored in database tables such as mission tables, mission file tables, mission service tables and the like. The data is presented in the tables so as to be processable by a machine such as a computer or microprocessor.

Figure 4:
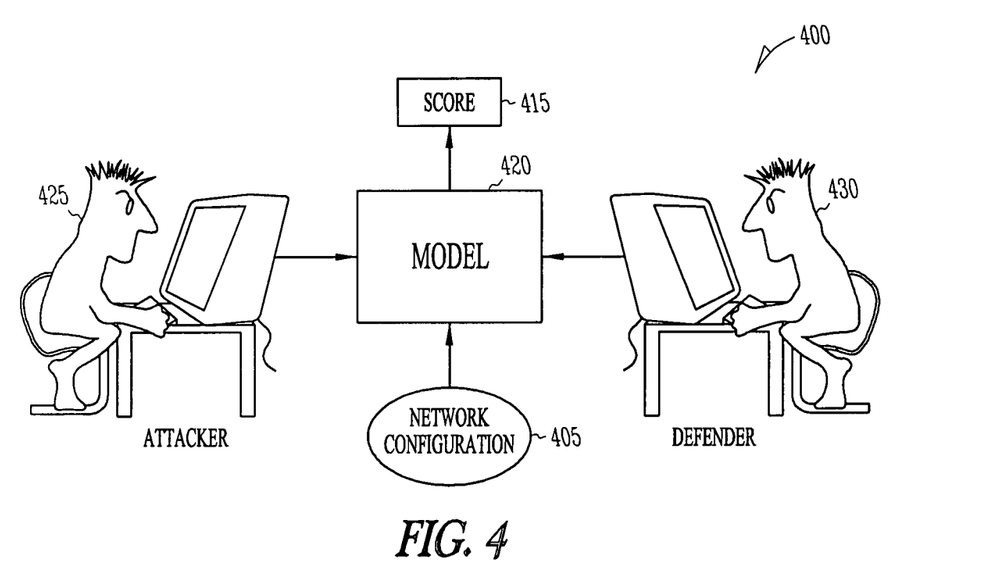
FIG. 4 is an illustration of one embodiment of a security modeling system according to the teachings of the present invention.

FIG. 4 is an illustration of one embodiment of a security modeling system indicated generally at 400, according to the teachings of the present invention. The security modeling system includes a model 420 which represents a simulated network. The model 420 receives network configuration data from the network configuration module 405. The system provides a score 415 which measures a client's effectiveness. The client includes an attacker 425, a defender 420 or any combination of attackers and defenders to include robots. A client's effectiveness is based on their ability to attack or defend identified critical resources, taking into account time and resources used. In this embodiment, the system 400 is operating with an attacker 425 and a defender 430 in real time.

In another embodiment, the system 400 is operated using an attacker model instead of an attacker in real time. In alternate embodiments, the system 400 is operated with any combination of attackers 425 and defenders 430 in real time or as modeled scenarios. The attackers 425 or defenders 430 comprise clients, administrators, hackers or other users, internal or external to a network.

Figure 5:
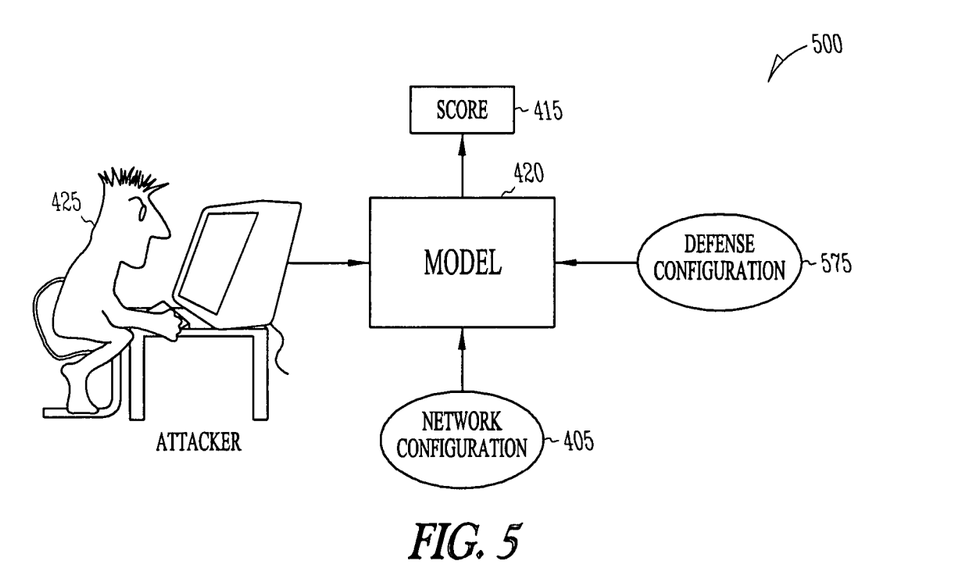
FIG. 5 is an illustration of another embodiment of a security modeling system according to the teachings of the present invention.

FIG. 5 is an illustration of one embodiment of a security modeling system indicated generally at 500, according to the teachings of the present invention. The system includes the following components as discussed with reference to FIG. 4; a model 420, a network configuration module 405, an attacker 425 and a score 415. The figure shows a defense configuration module 575 which provides information about the attack and defense scenario such as critical resource information, defense strategies, mission objectives and the like to the model 420. In this embodiment, the system 500 is operating with an attacker 425 in real time.

In another embodiment, the system 500 is operated using an attacker model instead of an attacker in real time. In alternate embodiments, the system 500 is operated with any combination of attackers 425 and defenders to include robots in real time or as modeled scenarios. The attackers 425 or defenders comprise clients, administrators, hackers or other users, internal or external to a network.

Figure 6:
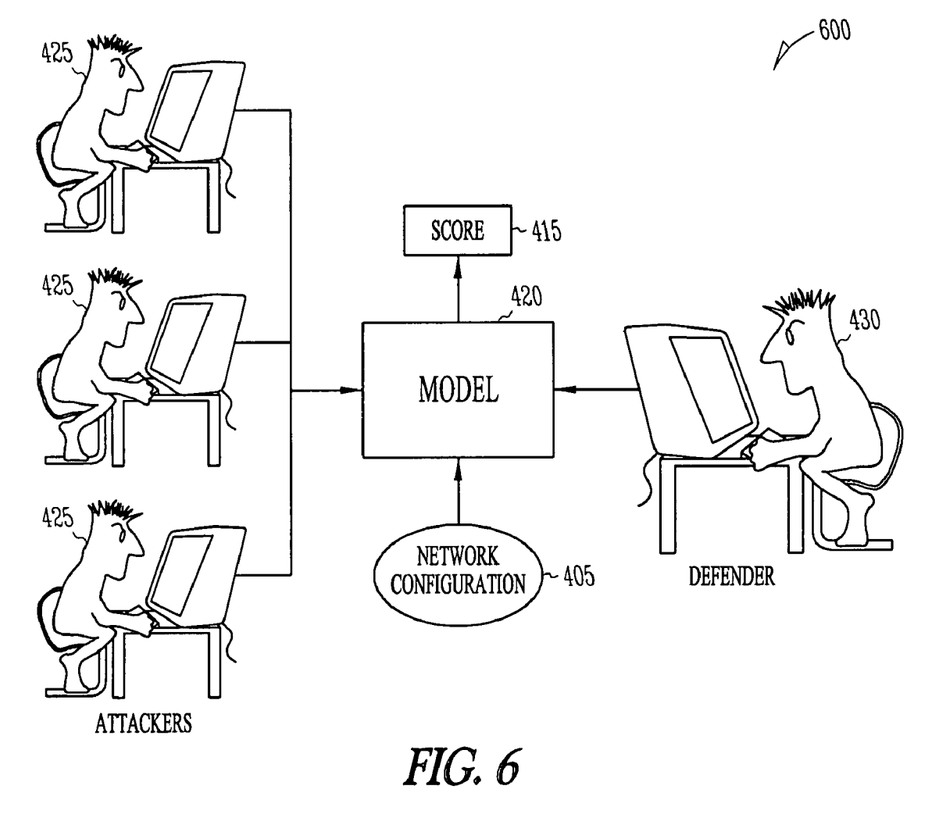
FIG. 6 is an illustration of an alternate embodiment of a security modeling system according to the teachings of the present invention.

FIG. 6 is an illustration of one embodiment of a security modeling system indicated generally at 600, according to the teachings of the present invention. The system includes the following components as discussed with FIG. 4; a model 420; a network configuration module 405, a plurality of attackers 425, a defender 430 and a score. In this embodiment, the system 600 is operating with a plurality of attacker 425 and a defender 430 in real time.

In another embodiment, the system 600 is operated using an attacker model instead of an attacker in real time. In alternate embodiments, the system 600 is operated with any combination of attackers 425 and defenders 430 in real time or as modeled scenarios. The attackers 425 or defenders 430 comprise clients, administrators, hackers or other users, internal or external to a network.

Figure 7:
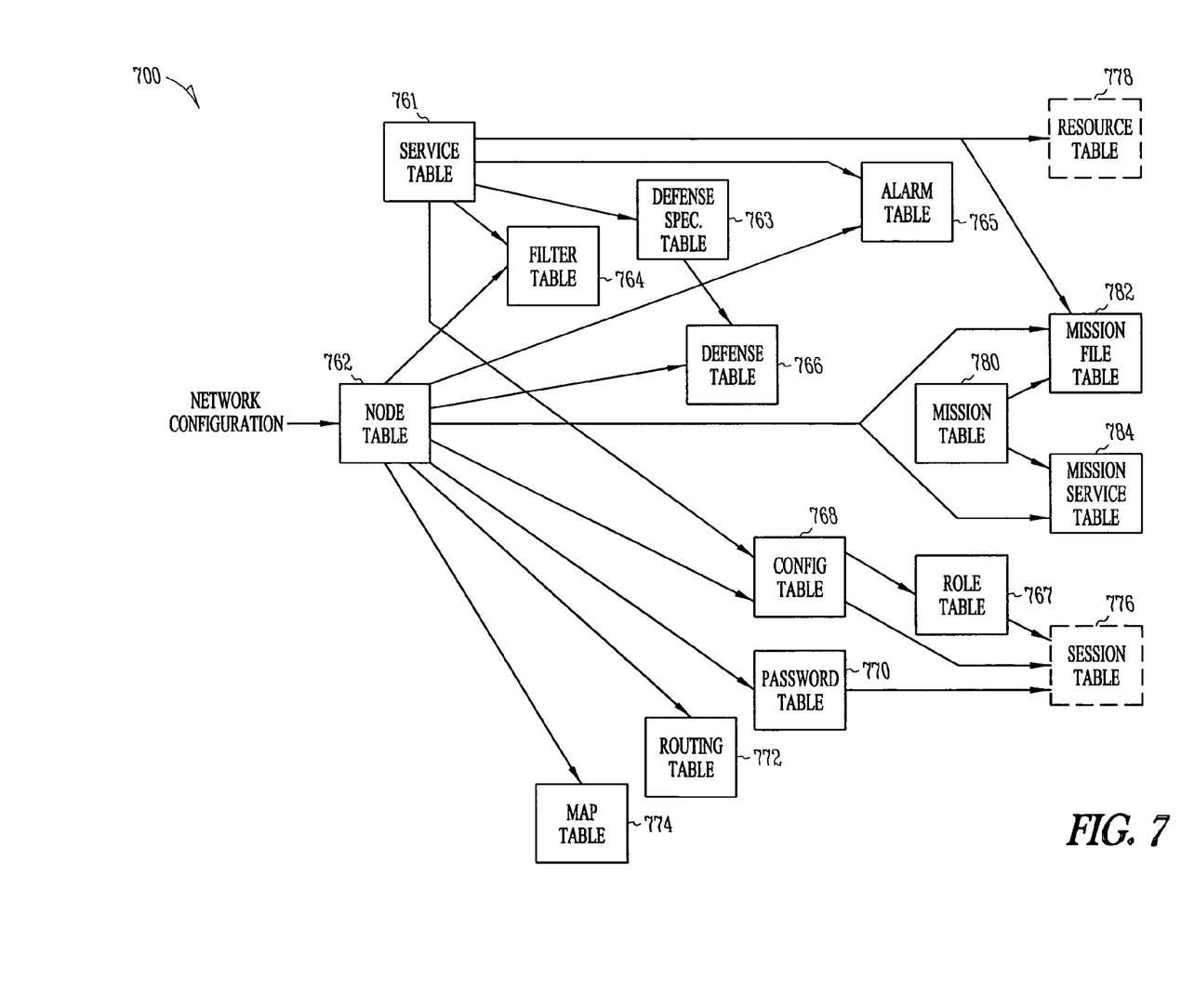
FIG. 7 is an illustration of one embodiment of database tables for a security modeling system according to the teachings of the present invention.

FIG. 7 is an illustration of one embodiment of database tables for a security modeling system, indicated generally at 700, according to the teachings of the present invention. The database tables and their interdependencies are shown in FIG. 7. In alternate embodiments, different database tables and interdependencies are used which contain some or none of the tables shown in FIG. 7. The data is presented in the tables so as to be processable by a machine such as a computer or microprocessor. The information contained in the tables is by example and it is understood that different data files and configurations can be used.

Network configuration data which includes network topology and configuration for an objective network is represented in a plurality of network tables. The network tables include node table 762, routing table 772, configuration table 768, filter table 764, defense table 766, defense specification table 763, password table 770, alarm table 765 and map table 774. In an alternate embodiment, the network configuration data is stored in any combination of the described network tables, other database tables or other storage databases.

Node table 762 is used to define particular nodes and some of their characteristics. A node includes a computer system or an entity that is part of the wider network in which the computer resides such as a phone, a door or a cable. Information stored in a node table 762 is presented in columns with heading such as "NODE", "NETTYPE", "NET", "ADDRESS", "MASK", "BROADCAST", "GROUP", "DNS1", "DNS2", "ROUTING_PROTOCOL" and the like. An example of a portion of a node table file looks like this:

```

# NODE,   NETTYPE, NET, ADDRESS, MASK,   BROADCAST, GROUP, DNS1,
DNS2, ROUTING_PROTOCOL

blackberry, n,    jam, 172.010.010.002, /27, 172.010.010.191, preserves, -, -, -
blueberry, n,     jam, 172.010.010.003, /27, 172.010.010.191, preserves, -, -, -
raspberry, n,     jam, 172.010.010.004, /27, 172.010.010.191, preserves, -, -, -
strawberry, n,    jam, 172.010.010.005, /27, 172.010.010.191, preserves, -, -, -
```

Routing table 772 is coupled to node table 762, and is used for routing to a particular client specified address from the current node. Routing table 772 is used to represent computer network information. The information stored in a routing table 772 is presented in columns with headings such as "NODE", "BURB", "TARGET", "GATEWAY", "FLAGS", "NETWORK", "INFERRED" and the like. An example of a portion of a routing table file looks like this:

```

# NODE, BURB, TARGET, GATEWAY, FLAGS, NETWORK,
INFERRED
# blueberry, *,   000.000.000.000,   172.010.010.001, G,    jam,
-# jam-fw

```

Note:
A "burb" is a network or a region containing components of a computer.

Configuration table 768 is also coupled to node table 762 and defines the configuration of the network. For example, for each protocol on each network connection of each node there can be a service (brand of software application) of a specified version and patch level installed. The information stored in a configuration table 768 is presented in columns with headings such as "NODE", "BURB", "PROTOCOL", "SERVICE", "VERSION", "STATE" and the like. An example of a portion of a configuration table file looks like this:

```

# NODE, BURB,   PROTOCOL,    SERVICE,    VERSION,    STATE

blueberry, *,   *,           nt,         4.0,        00
blueberry, *,   ftp,         iis,        1.0,        00
blueberry, *,   icmp,        iis,        1,          00
```

Filter table 764 which is coupled to node table 762 represents filtering rules, such as are contained on firewalls and filtering routers or other systems, to block the passage of connections through the filtering node. The information stored in a filter table file looks like this:

```

# NODE_NAME,    RESULT,      ALARM_ACTION,
# SRC_NODE,     SRC_MASK,    SRC_NET,
# DEST_NODE,    DEST_MASK,   DEST_NET,
# SERVICE,      ACTION,      RESOURCE

# allow us to access ourselves

jelly-fw, +, -, jelly-fw, *, *, jelly-fw, *, *, *,*,*

# allow communication with jam-fw (jam firewall) for all protocols

```

-continued

```
jelly-fw, +, -, jelly-fw, *, *, jelly-fw, *, *, *,*,*
jelly-fw, +, -, jam-fw, *, *, jelly-fw, *, *, *,*,*

# allow communication with any node on the jam lan for all protocols

```

-continued

```
jelly-fw, +, –, jelly-fw, *, *, *, *, jam, *,*,*
jelly-fw, +, –, *, *, jam, jelly-fw, *, *, *,*,*

```

Defense table 766 is coupled to node table 762 and defense specification table 763 is coupled to defense table 766. Defense 766 and defense specification tables 763 record the defense conditions that are available at each node and their current values. The information stored in a defense table 766 is presented in columns with headings such as "node", "protocol", "knob", "setting" and the like. An example of a portion of a defense table file looks like this:

```

# NODE,       PROTOCOL,    KNOB,        SETTING

blueberry,    *,           pwd_str,     4 # dictionary password
blueberry,    *,           toolset,     0 # language compilers and
                                         libraries
```

The information stored in a defense specification table file looks like this:

```

# Tripwire-style Intrusion Detection

   *, tripwire, *,   Tripwire-style ID,  0,    1
   *, tripwire, 0,   not enabled,        0,    0
   *, tripwire, 2,   enabled,   100,    10

# - - - - - - various shell exploits - - - - - - -

   shell_exploit, ff.core, *, apply various ff.core fixes,   0, 0
   shell_exploit, ff.core, 0, no,            0, 0
   shell_exploit, ff.core, 2, yes,                          10, 0

```

Password table 770 is coupled to node table 762 and is used to represent accounts and the passwords associated with those accounts. The information stored in a password table 770 is presented in columns with headings such as "NODE", "PASSWORD", "STRENGTH", "ACCESS", "USER NAME" and the like. An example of a portion of a password table file looks like this:

```

# NODE,       PASSWORD,   STRENGTH,    ACCESS, USER NAME

blueberry,    blue_pass,  6,    8,    jam_admin
blueberry,    jm1_pass,   4,    4,    jam-1
blueberry,    jm2_pass,   4,    4,    jam-2
blueberry,    jm3_pass,   4,    4,    jam-3

```

Map table 774 is coupled to node table 762 and is used to hold a representation of the network for rendering a network map.

Vulnerabilities for operating systems, network protocols, network service and the like are stored in a vulnerability database. Vulnerabilities are stored in service table 761. Each vulnerability recorded in the service table 761 includes the service, i.e. OS/protocol/application, to which it applies including version and patch levels, the defense conditions that might close the vulnerability and the maximum level of the condition for which the vulnerability still exists, the resources and state conditions needed to exercise the vulnerability and the effects of exploiting the vulnerability. The information stored in a service table file looks like this:

```

#   Rootshell ffcore.txt 990520
#   Solaris 2.5 and 2.6
#   BlackCode solaris | ff.core#2 990526
#   Solaris 2.5 and 2.6

    Exploit ff.core to gain a root login, solaris, 2.5, 2.6
shell_exploit, sh_app, 0, ~, ff.core telnet, -, -, tripwire, 1, 8080, 0000, 1,
    alarm, tripwire: files are being changed | 2
    -, solaris, 2.5, 2.6
shell_exploit, sh_app, 0, ~, ff.core telnet, -, -, ff.core, 1, 8080, 0000, 10,
    newses, telnet/$n;
    access, 8

```

Alarm table 765 is coupled to node table 762 and service table 761. The alarm table includes node data such as the name of a node or a computer and messages of alarms that have been triggered.

Objectives specification information which includes mission objectives, adversary characteristics and system state data is represented in a plurality of tables. These tables include mission table 780, mission file table 782, mission service table 784, role table 767 and resource table 778. Mission file table 782 and mission service table 784 are each coupled to both node table 762 and mission table 780. Mission objectives are modeled in the mission tables 780, 782 and 784. Mission objectives are modeled as nodes, files or services that need to be protected against availability, confidentiality and integrity attacks and the like.

The information stored in a mission table 780 is presented in columns with headings such as "MISSION ID", "AVAILABILITY", "SECURITY", "INTEGRITY", "MODE", "DESCRIPTION" and the like. An example of a portion of a mission table file looks like this:

```

# MISSION ID, AVAILABILITY, SECURITY, INTEGRITY, MODE,
  DESCRIPTION

change orders,  100,  50,    1000,  any,    Modify resupply orders.
```

The information stored in a mission file table 782 is presented in columns with headings such as "MISSION", "NODE", "BURB", "RESOURCE", "TYPE", "VALUE", "STATE", "OWNER" and the like. An example of a portion of a mission file table file looks like this:

```

# MISSION, NODE, BURB, RESOURCE, TYPE, VALUE, STATE,
  OWNER

sysinfo, marmalade-fw, *, acl_file, sf,            0,   00,   sysadm
change orders, ginger, marmalade, order_app, ex,  10,   00,   sysadm
change orders, ginger, marmalade, order_info, df, 10,   00,   sysadm
```

The information stored in a mission service table 784 is presented in columns with headings such as "MISSION", "NODE", "BURB", "PROTOCOL" and the like. An example of a portion of a mission service table file looks like this:

```

# MISSION,      NODE,      BURB,    PROTOCOL

change orders,  jam-fw, *,          firewall
change orders,  jam-fw, *,          ip
change orders,  jam-fw, *,          radius
change orders,  jam-fw, *,          snmp

```

Role table 767 is coupled to configuration table 768. Adversaries such as attackers or other users are modeled in the role table 767. Each role in the table 767 represents a particular type of adversary or defender. Each role has associated with it a number of characteristics including: a set of nodes to attack, a set of nodes to defend, a set of mission objectives, a set of initial resources, a starting node and the like.

The security modeling system according to the present invention includes a simulator or a state machine. Portions of the state are recorded in a number of the tables shown in FIG. 7 which includes the resource table 778, session table 776 and configuration table. Resource table 778 is coupled to service table 761 and includes tables which identify the resources each client has accumulated. In one embodiment, there is one resource table per client. In an alternate embodiment, there are more than one resource tables per client. The service table 761 defines the actions that a client can perform and the effects on the state that result from the actions. The session table 776 is coupled to role table 774, configuration table 768 and password table 776. The session table 776 includes session records of where a user has been in the network. The session table 776 includes the path that a client has taken within the network as the client moves from one location to the next. In one embodiment, there is one session table per client. In alternate embodiments, there is more than one session table per client.

Figure 8:
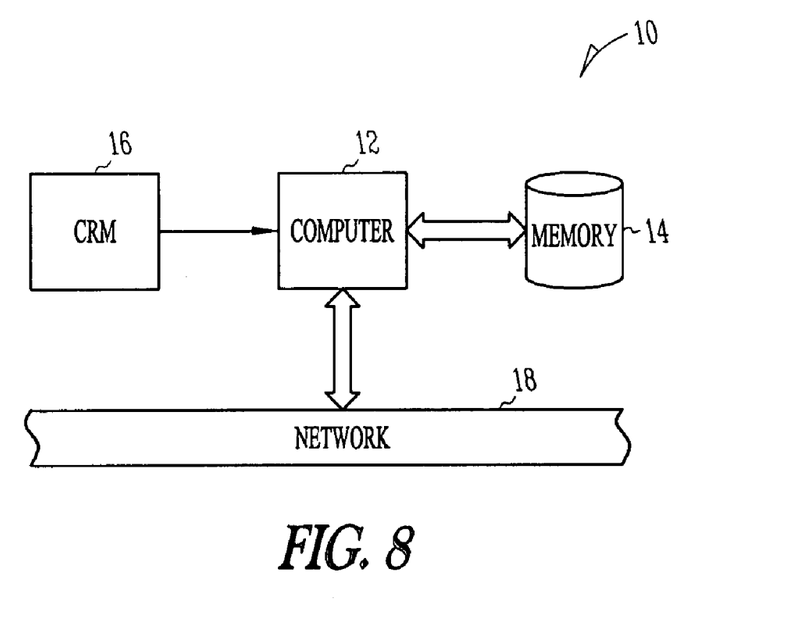
FIG. 8 is an illustration of one embodiment of a security modeling system according to the teachings of the present invention.

FIG. 8 illustrates a security modeling system 10. System 10 includes a computer 12 connected to nonvolatile memory 14. The term "computer" is defined here to include any digital or analog data processing unit. Examples include personal computers, workstations, set top boxes, mainframes, servers, supercomputers, laptops or personal digital assistants capable of embodying the inventions described herein.

In one embodiment, computer 12 is capable of reading program code such as computer instructions and data from computer readable medium 16. Examples of articles comprising computer readable media are read-write or read-only memory devices such as floppy disks, hard drives, CD-ROM or DVD.

In one embodiment, computer 12 is capable of reading information and receiving commands and data from a network 18 and of writing data and commands to network 18.

Figure 9:
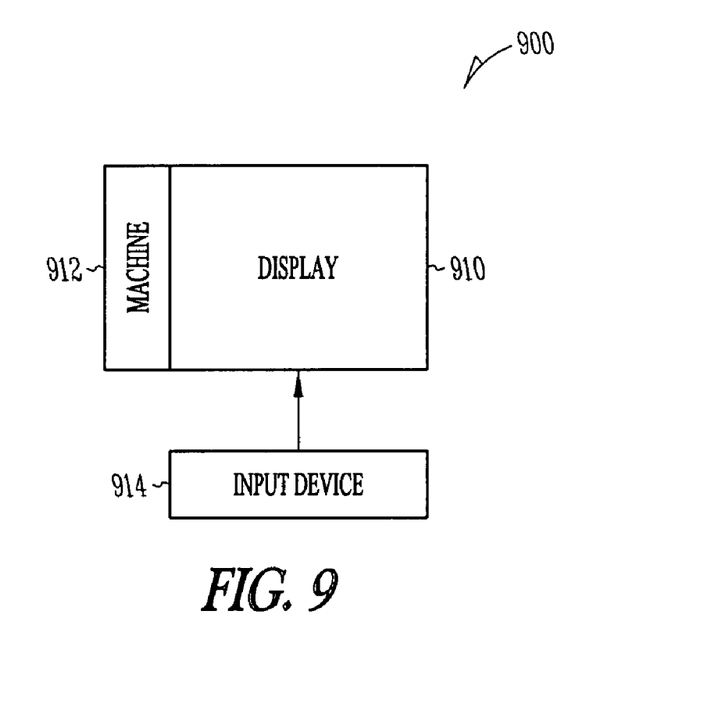
FIG. 9 is an illustration of one embodiment of a security modeling system as a game according to the teachings of the present invention.

FIG. 9 illustrates a security modeling system as an interactive game indicated generally at 900. The system includes a display 910 such as a television or computer monitor which is coupled to a machine such as a computer or microprocessor. The system is interactive through a user interface and a player uses an input device 914 such as a keyboard, keypad or joystick to provide responses and attack or defense information. The game 900 has the ability to keep track of actions and score the clients or players on their ability to attack or defend their network territory.

In an alternate embodiment, the game allows several players to interact at the same time through graphical user interfaces. The players may include clients such as attackers, defenders or administrators to play. In one embodiment, each of the players has a different role.

In one embodiment, the security modeling system is a training tool used to educate system administrators, information technology managers and other users on how to build and protect secure networks.

In one embodiment, the security modeling system is modular. The network configuration module, mission objectives module, vulnerability database and the graphical user interfaces are all interchangeable with other modules such as modules containing network information, critical resource information, vulnerability data and user interfaces.

In another embodiment, the security modeling system includes a log or a recorder which allows the system to play back the moves of an attacker or defender or both.

In one embodiment, an attacker can send commands that simulate service functionality, that change services or nodes and that exploit vulnerabilities. The defender or administrator can interactively adjust the posture of a node, set router and firewall filtering policies, and reset nodes or services that have been disabled or compromise. In one embodiment, the user such as an attacker or defender can view a map of the network they are discovering. In another embodiment, the user can interact with the system using a map or network configuration data through manual input, point and click processes, touch screens and the like.

In one embodiment, the security modeling system is used to protect the network systems of military groups and government agencies. Sensitive national security information such as information about military and government personnel, available resources and logistical data need to be secure. Commanders in the field need to protect their assets and information and communication systems from being compromised. The security modeling system is used to identify potential security vulnerabilities as well as defend against attackers. The modeling system can be used during training exercises to determine any potential security vulnerabilities. A commander will be able to upgrade security measures during different threat scenarios by updating the mission objectives information in order to protect critical resources. For example, during a low threat scenario a commander may determine that information about supplies is not critical but in a higher threat scenario can modify the mission objectives information to identify supply information as a critical resource.

CONCLUSION

A security modeling system has been described. The security modeling system comprises a network configuration module having network configuration data and a simulator for simulating and analyzing networks based on the network configuration data. In addition, the simulator includes a network vulnerabilities database.

In an alternate embodiment, another security modeling system has been described. The security modeling system comprises a network configuration module having network configuration data and a simulator coupled to the network configuration module for simulating and analyzing networks based on the network configuration. The simulator includes a network vulnerabilities database. Additionally, the system includes an mission objectives module which is coupled to the simulator and includes critical resource information.

Further, in another embodiment a method of analyzing a computer network using a security modeling system has been described. The security modeling system includes a database of network vulnerability data. The method comprises providing a configuration of a computer network, simulating the network based on the network configuration and determining vulnerabilities of the simulated network using the vulnerability information stored in the database Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A network security modeling system comprising:
   a network configuration module having network configuration data; and
   a simulator coupled to the network configuration module to simulate and analyze networks based on the network configuration data, wherein the simulator includes a network vulnerabilities database, and wherein the network vulnerabilities database includes:
      a plurality of known network vulnerabilities, wherein each network vulnerability includes a service to which it applies, defense conditions that might close the vulnerability, and resource and state conditions needed to exercise the vulnerability;
   wherein the simulator includes a defender and an attacker user interface.

2. The system of claim 1, wherein the network vulnerabilities database includes network vulnerability, attack and exploitation data.

3. The system of claim 2, wherein the simulator includes a means for receiving the network vulnerability, attack and exploitation data.

4. A network security modeling system comprising:
   a network configuration module having network configuration data;
   a simulator coupled to the network configuration module for simulating and analyzing networks based on the network configuration, wherein the simulator includes a network vulnerabilities database; and
   a mission objectives module coupled to the simulator, wherein the mission objectives module includes critical resource information used to determine network components that are involved in a specific attack scenario.

5. The system of claim 4, wherein the network vulnerabilities database includes network vulnerability, attack and exploitation data.

6. The system of claim 4, wherein the critical resource information includes goals, expectations and constraints for simulating the network.

7. The system of claim 4, wherein the simulator includes a means for receiving the network vulnerability, attack and exploitation data.

8. The system of claim 4, wherein the simulator includes a defender and an attacker interface.

9. A method of analyzing a computer network using a security modeling system, wherein the security modeling system includes a database of network vulnerability information, the method comprising:
   receiving a network configuration of a computer network;
   simulating the network based on the network configuration; and
   determining vulnerabilities of the simulated network using the vulnerability information stored in the database, wherein the database includes a plurality of known network vulnerabilities, wherein each network vulnerability includes:
      a plurality of known network vulnerabilities, wherein each network vulnerability includes a service to which it applies, defense conditions that might close the vulnerability, and resource and state conditions needed to exercise the vulnerability;
   wherein simulating the network includes:
      receiving mission objectives;
      storing the mission objectives; and
      simulating the network based on the network configuration and the mission objectives.

10. The method of claim 9, wherein receiving a network configuration includes analyzing the network with a network discovery tool.

11. The method of claim 9, wherein determining vulnerabilities includes modifying the simulation using a graphical user interface.

12. The method of claim 11, wherein modifying the simulation includes dynamically interacting with an attacker.

13. The method of claim 12, wherein modifying the simulation includes dynamically interacting in real time with the security modeling system.

14. The method of claim 11, wherein modifying the simulation includes dynamically interacting in real time with the security modeling system.

15. The method of claim 9, wherein determining vulnerabilities of the simulated network includes updating the vulnerabilities database when vulnerabilities are detected.

16. A machine-readable medium that provides instructions which, when executed by a machine, cause the machine to perform the method of claim 9.

17. A method of opposing attackers of a computer network, comprising:
    receiving a network configuration, wherein the network configuration comprises computer hardware and software component information;
    receiving mission objectives including critical resource information used to determine network components that are involved in a specific attack scenario;
    receiving commands from a network attacker;
    simulating the network based on the commands received from the network attacker, wherein simulating the network includes determining results as a function of the network configuration, mission objectives and stored vulnerability data for the described computer hardware and software components; and
    responding to the network attacker, wherein responding to the attacker includes responses selected from a group of responses including imposing barriers, providing response messages and protecting the network.

18. The method of claim 17, wherein simulating the network further includes receiving commands from a defender and determining results based on the defender commands.

19. The method of claim 17, wherein receiving configuration includes receiving critical resource information, wherein the critical resource information includes goals, expectation and constraints for simulating the network.

20. The method of claim 19, wherein receiving commands includes receiving attack actions which include commands that simulate service functionality, commands that change services or nodes, and commands that exploit vulnerabilities.

21. A network security modeling system for simulating objective networks comprising:
    a simulator having a plurality of databases, wherein the plurality of databases include mission objectives tables including information used to determine network components that are involved in a specific attack scenario, vulnerability tables, and network configuration tables, wherein the network configuration tables include network configuration data; and a graphical user interface which operates with the simulator to allow input and output to clients.

22. The system of claim 21, wherein the mission objectives tables include mission tables, mission files tables and mission services tables.

23. The system of claim 21, wherein the vulnerability tables include service tables.

* * * * *